US012605843B2

(12) United States Patent
Lin et al.

(10) Patent No.: US 12,605,843 B2
(45) Date of Patent: Apr. 21, 2026

(54) PHOTOGRAPHING METHOD FOR PICKING OR PLACING, PHOTOGRAPHING SYSTEM, AND TRANSPORT ROBOT

(71) Applicant: HAI ROBOTICS CO., LTD., Shenzhen (CN)

(72) Inventors: Han Lin, Shenzhen (CN); Jui-chun Cheng, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 394 days.

(21) Appl. No.: 18/064,577

(22) Filed: Dec. 12, 2022

(65) Prior Publication Data

US 2023/0111540 A1     Apr. 13, 2023

Related U.S. Application Data

(63) Continuation       of       application       No. PCT/CN2021/103043, filed on Jun. 29, 2021.

(30) Foreign Application Priority Data

Jun. 12, 2020     (CN) .......................... 202010537599.8

(51) Int. Cl.
*G06F 17/00*          (2019.01)
*B25J 9/00*           (2006.01)
(Continued)

(52) U.S. Cl.
CPC ........... *B25J 9/1697* (2013.01); *B25J 9/0009* (2013.01); *B25J 9/1687* (2013.01); *B25J 19/023* (2013.01); *G06T 7/50* (2017.01); *G06T 7/70* (2017.01)

(58) Field of Classification Search
CPC ...... B25J 9/1697; B25J 9/0009; B25J 9/1687; B25J 19/023; B25J 5/00; B25J 9/1664;
(Continued)

(56) References Cited

U.S. PATENT DOCUMENTS 9,020,636 B2 *   4/2015   Tadayon .................... B25J 5/02
                                                              901/1
9,481,087 B2 *  11/2016   Song ...................... B25J 9/1679
                    (Continued)

FOREIGN PATENT DOCUMENTS

AT                500229 A1 *  11/2005  ............... B66F 9/07
CN        103708161 A      4/2014
                    (Continued)

OTHER PUBLICATIONS

Pick and Place Robots: An In-Depth Guide to Their Functionality and Applications (Year: 2024).*

(Continued)

*Primary Examiner* — Ronnie M Mancho
(74) *Attorney, Agent, or Firm* — Ladas & Parry, LLP

(57)          ABSTRACT

A photographing method for picking or placing, applied includes: obtaining first multi-dimensional image information of a target position in a target shelf; determining, according to the first multi-dimensional image information, whether there is a first item in the target position; and determining a photographing strategy of the photographing module according to a determining result, wherein the photographing strategy includes one of: the photographing module not moving with the handling apparatus in a telescopic direction for continued photographing, the photographing module moving a preset distance along the telescopic direction with the handling apparatus, and performing an operation of starting a solution; the solution includes at least one of stopping photographing, sending a warning signal, and reporting to a server to which the transport robot belongs.

8 Claims, 9 Drawing Sheets

(51) Int. Cl.

| | | |
|---|---|---|
| *B25J 9/16* | (2006.01) | |
| *B25J 19/02* | (2006.01) | |
| *G06T 7/50* | (2017.01) | |
| *G06T 7/70* | (2017.01) | |

(58) Field of Classification Search
CPC ... B25J 13/08; G06T 7/50; G06T 7/70; G05B 2219/40006; G05B 2219/45063; H04N 23/695; H04N 23/60; H04N 7/185; B65G 2203/0233; B65G 2203/041; B65G 1/0492; B65G 1/1375; B65G 2203/04; B65G 1/1373; G06Q 10/087; B66F 9/07504; B66F 9/18
USPC ................................................ 700/759, 259
See application file for complete search history.

(56) References Cited

U.S. PATENT DOCUMENTS

| | | | | |
|---|---|---|---|---|
| 10,683,171 | B2 * | 6/2020 | Jarvis ................... | G05D 1/0234 |
| 10,821,871 | B2 * | 11/2020 | Huang ................. | G06T 7/0008 |
| 11,104,514 | B2 * | 8/2021 | Cheng ................. | B65G 1/0435 |
| 11,718,472 | B2 * | 8/2023 | Cheng ................. | B65G 1/0435 |
| | | | | 414/217 |
| 12,012,283 | B1 * | 6/2024 | Douglas .............. | B65G 1/1378 |
| 12,330,870 | B2 * | 6/2025 | Cheng ................. | B65G 1/0435 |
| 2017/0107055 | A1 * | 4/2017 | Magens ............... | B65G 1/1373 |
| 2017/0225891 | A1 * | 8/2017 | Elazary ............... | G05D 1/0234 |
| 2018/0005173 | A1 * | 1/2018 | Elazary ................ | B25J 13/085 |
| 2018/0057263 | A1 * | 3/2018 | Beer ................... | B25J 15/0616 |
| 2018/0305122 | A1 * | 10/2018 | Moulin ............... | B65G 1/0492 |
| 2019/0054932 | A1 | 2/2019 | Stadie | |
| 2019/0168392 | A1 * | 6/2019 | Väin ....................... | G06Q 10/00 |
| 2019/0354923 | A1 * | 11/2019 | Taira ...................... | G06V 20/10 |
| 2020/0097895 | A1 | 3/2020 | Deng | |
| 2020/0216266 | A1 * | 7/2020 | Shen .................... | G05D 1/0282 |
| 2020/0324972 | A1 * | 10/2020 | Cheng ................. | B65G 1/1375 |
| 2021/0341930 | A1 * | 11/2021 | Lin ........................ | G06V 20/58 |

FOREIGN PATENT DOCUMENTS

| | | | | | |
|---|---|---|---|---|---|
| CN | 108190796 | A | * | 6/2018 | .......... B66F 9/07504 |
| CN | 108712990 | A | | 10/2018 | |
| CN | 109132313 | A | | 1/2019 | |
| CN | 109214484 | A | | 1/2019 | |
| CN | 109264275 | A | | 1/2019 | |
| CN | 109592280 | A | | 4/2019 | |
| CN | 109775219 | A | | 5/2019 | |
| CN | 109782681 | A | | 5/2019 | |
| CN | 109784793 | A | | 5/2019 | |
| CN | 109977886 | A | | 7/2019 | |
| CN | 110182527 | A | | 8/2019 | |
| CN | 110239870 | A | | 9/2019 | |
| CN | 110340863 | A | * | 10/2019 | .......... B65G 47/907 |
| CN | 110472515 | A | | 11/2019 | |
| CN | 110482098 | A | | 11/2019 | |
| CN | 110589331 | A | | 12/2019 | |
| CN | 110949923 | A | | 4/2020 | |
| CN | 111470239 | A | * | 7/2020 | .............. B65G 1/04 |
| CN | 112758588 | A | * | 5/2021 | .............. B65G 1/04 |
| CN | 119079891 | A | * | 12/2024 | |
| EP | 3032460 | A1 | | 6/2016 | |
| FR | 2744109 | A1 | * | 8/1997 | ............... B66F 9/18 |
| JP | 2002068410 | A | | 3/2002 | |
| JP | 201820423 | A | | 2/2018 | |
| JP | 2019527172 | A | | 9/2019 | |
| JP | 202044598 | A | | 3/2020 | |
| JP | 2022508567 | A | | 1/2022 | |
| WO | WO2019095803 | A1 | | 5/2019 | |
| WO | WO2020067907 | A1 | | 4/2020 | |
| WO | WO-2020135460 | A1 | * | 7/2020 | .............. B66F 9/141 |
| WO | WO-2020147864 | A1 | * | 7/2020 | .............. G05D 1/617 |

OTHER PUBLICATIONS

Pick and Place Robots: An In-Depth Guide to Their Functionality and Applications (Year: 2024) (Year: 2024).*

International Search Report for PCT/CN2021/103043.

Reexamination notice of corresponding CN patent appl. No. 202010537599.8 mailed on Nov. 29, 2025.

"Information Processing Manual (vol. 1)", Edited by the Japanese Information Processing Society, p. 298, Published by Mechanical Engineering Publishing House, First Edition, First printing, Oct. 1985.

* cited by examiner

| | |
|---|---|
| first multi-dimensional image information of a target shelf including a target position is obtained | S201 |
| whether there is a first item in the target position is determined according to the first multi-dimensional image information | S202 |
| a photographing strategy of the photographing module is determined according to a determining result | S203 |

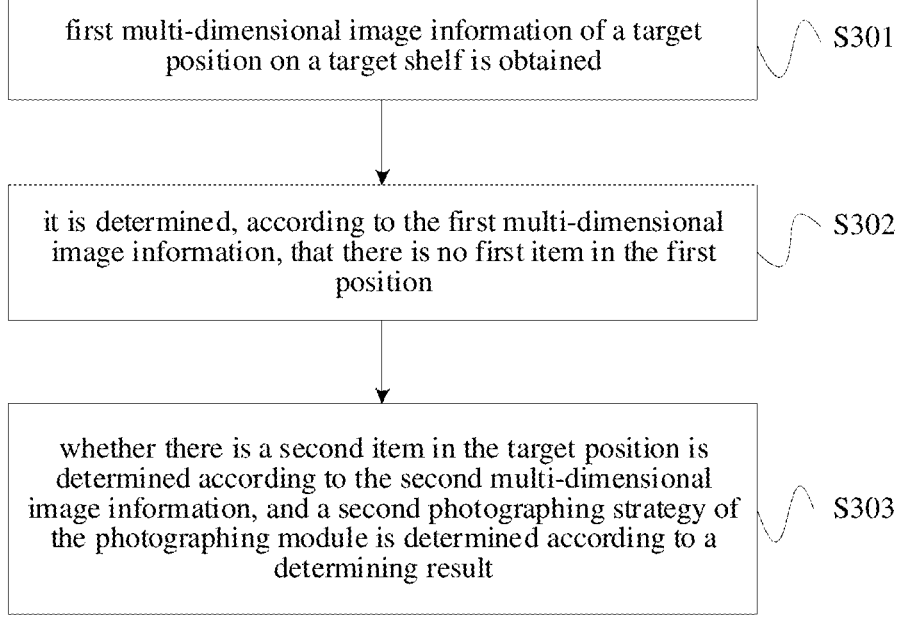

first multi-dimensional image information of a target position on a target shelf is obtained — S301 it is determined, according to the first multi-dimensional image information, that there is no first item in the first position — S302 whether there is a second item in the target position is determined according to the second multi-dimensional image information, and a second photographing strategy of the photographing module is determined according to a determining result — S303

FIG. 6

PHOTOGRAPHING METHOD FOR PICKING OR PLACING, PHOTOGRAPHING SYSTEM, AND TRANSPORT ROBOT

CROSS-REFERENCE TO RELATED APPLICATIONS

The present disclosure is a continuation of International Patent Application No. PCT/CN2021/103043 filed on Jun. 29, 2021, which claims priority to Chinese Patent Application No. 202010537599.8, filed with the China National Intellectual Property Administration on Jun. 12, 2020, and entitled "PHOTOGRAPHING METHOD FOR PICKING OR PLACING, PHOTOGRAPHING MODULE, AND TRANSPORT ROBOT", which is hereby incorporated herein by reference in its entirety.

TECHNICAL FIELD

The present disclosure relates to the field of intelligent warehousing technologies, and in particular, to a photographing method for picking or placing, a photographing system, and a transport robot.

BACKGROUND

With the networking and intelligence in the field of intelligent manufacturing and warehousing logistics, warehousing logistics has a very important status in an enterprise production and management process. Transport robots can replace manual handling in an intelligent warehousing process, and demand for the transport robots rises year by year.

In the related art, a plurality of items are placed on a shelf, so that the difficulty of picking or placing of transport robots is increased. In addition, shelf vibration or manual operation errors in a real scenario further increase the difficulty of picking or placing of transport robots, so that the safety of picking or placing cannot be ensured.

SUMMARY

The present disclosure provides a photographing method for picking or placing, a photographing module, and a transport robot, so as to realize photographing along a depth direction of a shelf, and obtain multi-dimensional image information, so that the safety of picking or placing of the transport robot, and the working efficiency are improved.

In a first aspect, a photographing method for picking or placing provided according to embodiments of the present disclosure is applied to a transport robot, and the transport robot is provided with a handling apparatus for picking or placing, and a photographing module. The method includes: obtaining first multi-dimensional image information of a target shelf including a target position, where more than one storage positions are arranged in the target shelf along a depth direction of the target shelf; determining, according to the first multi-dimensional image information, whether there is a first item in the target position; and determining a photographing strategy of the photographing module according to a determining result, where the photographing strategy is used for obtaining target multi-dimensional image information of the target position, and the target position is a storage position in the target shelf from which the handling apparatus is to pick an item up, or a storage position in the target shelf to which the handling apparatus is to place an item.

In an optional embodiment, the target position is a shallow storage position at a first storage position in the target shelf along the depth direction of the shelf, a second storage position along the depth direction of the shelf, or a deep storage position behind the second storage position.

In an optional embodiment, in response to determining, according to the first multi-dimensional image information, that there is the first item in the target position, operation of picking is performed.

In an optional embodiment, the determining a photographing strategy of the photographing module according to a determining result includes: in response to determining, according to the first multi-dimensional image information, that there is the first item in the target position, and determining that the first item is a target item, performing operation of picking.

In an optional embodiment, the determining a photographing strategy of the photographing module according to a determining result includes: in response to determining, according to the first multi-dimensional image information, that there is the first item in the target position, determining whether the first item is the target item; and in response to determining that the first item is the target item, determining pose information of the target item according to the first multi-dimensional image information, and in a case that the pose information satisfies preset requirements, performing an operation of picking.

In an optional embodiment, the determining a photographing strategy of the photographing module according to a determining result includes: in response to determining, according to the first multi-dimensional image information, that there is the first item in the first position, determining whether the first item is the target item; and in response to determining that the first item is the target item, determining the pose information of the target item according to the first multi-dimensional image information, and in a case that the pose information does not satisfy the preset requirements, and that the number of consecutive photographing times reaches a preset threshold, performing an operation of starting a solution.

In an optional embodiment, the determining a photographing strategy of the photographing module according to a determining result includes: in response to determining, according to the first multi-dimensional image information, that there is the first item in the first position, determining whether the first item is the target item; and in response to determining that the first item is not the target item, in a case that the number of consecutive photographing times reaches the preset times threshold, performing an operation of starting the solution.

In an optional embodiment, the determining a photographing strategy of the photographing module according to a determining result includes: in response to determining that there is no first item in a first position, in a case that the number of consecutive photographing times reaches the preset times threshold, performing the operation of starting the solution.

In an optional embodiment, the determining a photographing strategy of the photographing module according to a determining result includes: in response to determining, according to the first multi-dimensional image information, that there is no first item in the target position, performing the operation of placing.

In an optional embodiment, the determining a photographing strategy of the photographing module according to a determining result includes: in response to determining, according to the first multi-dimensional image information, that there is the first item in the first position, performing an operation of starting the solution.

In an optional embodiment, the first multi-dimensional image information includes first depth information, and whether there is the first item in the target position is determined through the first depth information.

In an optional embodiment, the target position is the deep storage position, and in response to detecting that there is a second item in any storage position in front of the deep storage position, an operation of starting a solution is performed.

In an optional embodiment, the first multi-dimensional image information includes the first depth information, and whether there is the second item is determined by detecting whether the first depth information corresponds to depth information of the target position.

In an optional embodiment, the obtaining first multi-dimensional image information of a target shelf including a target position includes: the photographing module moving, with the handling apparatus, a preset distance along a telescopic direction.

In an optional embodiment, the handling apparatus telescopically moves outside the range of the target shelf, or extends into the range of the target shelf to move.

In an optional embodiment, the solution includes: at least one of stopping photographing, sending a warning signal, and reporting to a server to which the transport robot belongs.

In a second aspect, a photographing method for picking or placing provided according to embodiments of the present disclosure is applied to a transport robot, and the transport robot is provided with a handling apparatus for picking or placing, and a photographing module. The method includes: obtaining first multi-dimensional image information of a first position on a target shelf, where a plurality of storage positions are arranged in the target shelf along a depth direction of the shelf, and the plurality of storage positions include a target position and a first position in front of the target position; determining, according to the first multi-dimensional image information, that there is no first item in the first position, and determining a first photographing strategy of the photographing module to obtain second multi-dimensional image information; and determining, according to the second multi-dimensional image information, whether there is a second item in the target position, and determining a second photographing strategy of the photographing module according to a determining result, where the second photographing strategy is used for obtaining target image information of the target position, and the target position is a storage position in the target shelf from which the handling apparatus is to pick an item up, or a storage position in the target shelf to which the handling apparatus is to place an item.

In an optional embodiment, in response to detecting, according to the first multi-dimensional image information, that there is the first item in the first position, an operation of starting the solution is performed.

In an optional embodiment, in response to determining that there is the first item in the first position, in a case that the number of consecutive photographing times reaches a preset times threshold, an operation of starting the solution is performed.

In an optional embodiment, the determining a first photographing strategy of the photographing module includes: in response to determining, according to the first multi-dimensional image information, that there is no first item in the first position, the photographing module moving, according to the depth information of the target position in the first multi-dimensional image information, and in combination with a control instruction, a preset distance along a telescopic direction with the handling apparatus, so as to form the second multi-dimensional image information.

In an optional embodiment, the determining a second photographing strategy of the photographing module according to a determining result includes: in response to determining, according to the second multi-dimensional image information, that there is the second item in the target position, performing retrieval.

In an optional embodiment, the determining a second photographing strategy of the photographing module according to a determining result includes: in response to determining, according to the second multi-dimensional image information, that there is the second item in the target position, and it is determined that the second item is a target item, performing an operation of picking.

In an optional embodiment, the determining a second photographing strategy of the photographing module according to a determining result includes: in response to determining, according to the second multi-dimensional image information, that there is the second item in the target position, and that the second item is the target item, and in a case that pose information of the target item satisfies preset requirements, performing an operation of picking.

In an optional embodiment, the determining a second photographing strategy of the photographing module according to a determining result includes: in response to determining, according to the second multi-dimensional image information, that there is the second item in the target position, determining whether the second item is the target item; and in response to determining that the second item is the target item, determining the pose information of the target item according to the second multi-dimensional image information, and in a case that the pose information does not satisfy the preset requirements, and that the number of consecutive photographing times reaches the preset times threshold, performing an operation of starting the solution.

In an optional embodiment, the determining a second photographing strategy of the photographing module according to a determining result includes: in response to determining, according to the second multi-dimensional image information, that there is the second item in the target position, determining whether the second item is the target item; and in response to determining that the second item is not the target item, in a case that the number of consecutive photographing times reaches the preset times threshold, performing the operation of starting the solution.

In an optional embodiment, the determining a second photographing strategy of the photographing module according to a determining result includes: in response to determining that there is the second item in the target position, in a case that the number of consecutive photographing times reaches the preset times threshold, performing the operation of starting the solution.

In an optional embodiment, the determining a second photographing strategy of the photographing module according to a determining result includes: in response to determining, according to the second multi-dimensional image information, that there is no second item in the target position, the photographing module moving, according to the depth information of the target position in the second multi-dimensional image information, and in combination with the control instruction, the preset distance along the telescopic direction with the handling apparatus.

In an optional embodiment, the determining a second photographing strategy of the photographing module according to a determining result includes: in response to determining that there is the second item in the target position, in a case that the number of consecutive photographing times reaches the preset threshold, starting the solution.

In a third aspect, a photographing system for picking or placing provided according to embodiments of the present disclosure includes: a memory, a processor, and a photographing module, where the memory stores executable instructions executable by the processor, and the processor is configured to execute the executable instructions and control the photographing module to perform the photographing method according to any one of the first aspect and the second aspect.

In a fourth aspect, a photographing module provided according to embodiments of the present disclosure is applied to the method according to any one of the first aspect and the second aspect. The photographing module is mounted on at least one of the following parts of the handling apparatus: a front end of a fork finger, a bottom of a pallet, or a rear end of the fork.

In an optional embodiment, the photographing module includes at least one of a two-dimensional camera, a three-dimensional camera, a variable-focus camera, and a camera matrix.

In an optional embodiment, the photographing module includes: a camera with a telephoto lens and a camera with a short focus lens, and the photographing module is mounted at the bottom of the pallet or the rear end of the fork of the handling apparatus.

In an optional embodiment, the photographing module is mounted at the front end of the fork finger of the handling apparatus, and the photographing module moves a preset distance along a telescopic direction with the fork finger of the handling apparatus.

In an optional embodiment, the photographing module includes: the variable-focus camera, and the photographing module is mounted at the bottom of the pallet or the rear end of the fork of the handling apparatus.

In an optional embodiment, the photographing module includes at least one of the camera with the telephoto lens, the camera with the short focus lens, or the variable-focus camera.

In a fifth aspect, a transport robot provided according to embodiments of the present disclosure includes a movable chassis, a handling apparatus, a storage shelf, a lifting or lowering assembly, a photographing module, and the photographing system according to the fourth aspect. The storage shelf is mounted on the movable chassis, the storage shelf is provided with a plurality of storage pallets distributed along a vertical direction, and each storage pallet is configured to store items; the handling apparatus is configured to handle items between a fixed shelf and any one of the storage pallets; the lifting or lowering assembly is configured to drive the handling apparatus to move in the vertical direction, so that the handling apparatus is lifted or lowered to a height corresponding to one of the plurality of the storage pallets or the fixed shelf; in a case that the handling apparatus is lifted or lowered to the height corresponding to one of the plurality of storage pallets, the handling apparatus moves an item to the corresponding storage pallet in a carrying direction, or the handling apparatus removes an item located on the corresponding storage pallet in a carrying direction; in a case that the handling apparatus is lifted or lowered to the height corresponding to the fixed shelf, the handling apparatus moves an item to the corresponding fixed shelf in the carrying direction, or the handling apparatus removes an item located on the corresponding fixed shelf in the carrying direction; the photographing module is configured to obtain multi-dimensional image information to determine a position of the item; and the handling apparatus includes a fork, and the fork is configured to pick or place the item.

The present disclosure provides a photographing method for picking or placing, applied to a transport robot, the transport robot being provided with a handling apparatus for picking or placing, and a photographing module, wherein the method includes: obtaining first multi-dimensional image information of a target position in a target shelf, wherein more than one storage positions are arranged in the target shelf along a depth direction of the target shelf, and the target position is a storage position in the target shelf from which the handling apparatus is to pick an item up, or a storage position in the target shelf to which the handling apparatus is to place an item; determining, according to the first multi-dimensional image information, whether there is a first item in the target position; and determining a photographing strategy of the photographing module according to a determining result, wherein the photographing strategy includes one of: the photographing module not moving with the handling apparatus in a telescopic direction for continued photographing, the photographing module moving a preset distance along the telescopic direction with the handling apparatus, and performing an operation of starting a solution; the solution includes at least one of stopping photographing, sending a warning signal, and reporting to a server to which the transport robot belongs.

In some embodiments, the target position is a shallow storage position at a first storage position in the target shelf along the depth direction of the shelf, a second storage position along the depth direction of the shelf, or a deep storage position behind the second storage position.

In some embodiments, when the transport robot is performing a task of picking, the determining a photographing strategy of the photographing module according to a determining result includes: in response to determining that there is the first item in the target position, performing an operation of picking; in response to determining that there is not the first item in the target position, continuing photographing for a plurality of times; determining, for a plurality of times, whether there is the first item in the target position according to image information obtained by the plurality times of photographing; in response to number of continuing photographing reaching a preset photographing threshold and results of the plurality times of determining are that there is no first item in the target position, performing the operation of starting the solution; or in response to determining that there is the first item in the target position, determining whether the first item is a target item according to the first multi-dimensional image information; in response to determining that the first item is the target item, performing the operation of picking; in response to determining that the first item is not the target item, continuing photographing for a plurality of times; determining, for a plurality of times, whether the first item is the target item according to image information obtained by the plurality times of photographing; in response to number of continuing photographing reaching the preset photographing threshold and results of the plurality times of determining are that the first item is not the target item, performing the operation of starting the solution; or in response to determining that there is the first item in the target position, determining whether the first item is a target item according to the first multi-dimensional image information; in response to determining that the first item is the target item, determining whether pose information of the target item satisfies preset requirements according to the first multi-dimensional image information; in response to determining that the pose information of the target item satisfies preset requirements, performing the operation of picking; in response to determining that the pose information of the target item does not satisfy the preset requirements, continuing photographing for a plurality of times; determining, for a plurality of times, whether the pose information of the target item satisfies the preset requirements according to image information obtained by the plurality times of photographing; in response to number of continuing photographing reaching the preset photographing threshold and results of the plurality times of determining are that the pose information of the target item does not satisfy the preset requirements, performing the operation of starting the solution.

In some embodiments, when the transport robot is performing a task of placing, the determining a photographing strategy of the photographing module according to a determining result includes: in response to determining that there is no first item in the target position, performing the operation of placing; and in response to determining that there is the first item in the target position, performing the operation of starting the solution.

In some embodiments, the first multi-dimensional image information includes first depth information, and the determining, according to the first multi-dimensional image information, whether there is a first item in the target position, includes: determining, according to the first depth information, whether there is the first item in the target position.

In some embodiments, the target position is the deep storage position, before the determining, according to the first multi-dimensional image information, whether there is a first item in the target position, the method further includes: determining, according to the first multi-dimensional image information, whether there is a second item in any storage position in front of the deep storage position, and in response to detecting that there is a second item in any storage position in front of the deep storage position, an operation of starting a solution is performed.

In some embodiments, the first multi-dimensional image information includes first depth information, and whether there is the second item is determined by detecting whether the first depth information corresponds to depth information of the target position.

In some embodiments, the obtaining first multi-dimensional image information of a target position on a target shelf includes: the photographing module moving, with the handling apparatus, a preset distance along a telescopic direction.

In some embodiments, the handling apparatus telescopically moves outside the range of the target shelf, or extends into the range of the target shelf to move.

The present disclosure provides a photographing method for picking or placing, applied to a transport robot, wherein the transport robot is provided with a handling apparatus for picking or placing, and a photographing module, and the method includes: obtaining first multi-dimensional image information of a first position in a target shelf, wherein a plurality of storage positions are arranged in the target shelf along a depth direction of the shelf, and the plurality of storage positions include a target position and the first position in front of the target position, and the target position is a storage position in the target shelf from which the handling apparatus is to pick an item up, or a storage position in the target shelf to which the handling apparatus is to place an item; determining, according to the first multi-dimensional image information, whether there is a first item in the first position; determining, in response to determining that there is no first item in the first position according to the first multi-dimensional image information, a first photographing strategy of the photographing module to obtain second multi-dimensional image information; determining, according to the second multi-dimensional image information, whether there is a second item in the target position; and determining a second photographing strategy of the photographing module according to a determining result, wherein the photographing strategy includes one of: the photographing module not moving with the handling apparatus in a telescopic direction for continued photographing, the photographing module moving a preset distance along the telescopic direction with the handling apparatus, and performing an operation of starting a solution; the solution includes at least one of stopping photographing, sending a warning signal, and reporting to a server to which the transport robot belongs.

In some embodiments, when the transport robot is performing a task of placing, after the determining, according to the first multi-dimensional image information, whether there is a first item in the first position, the method includes: in response to determining that there is the first item in the first position, an operation of starting a solution is performed; or in response to determining that there is the first item in the first position, continuing photographing for a plurality of times; determining, for a plurality of times, whether there is the first item in the target position according to image information obtained by the plurality times of photographing; in response to number of continuing photographing reaching a preset photographing threshold and results of the plurality times of determining are that there is no first item in the target position, performing the operation of starting the solution.

In some embodiments, when the transport robot is performing a task of picking, the determining a first photographing strategy of the photographing module includes: in response to determining, according to the first multi-dimensional image information, that there is no first item in the first position, controlling the photographing module to move, according to depth information of the target position in the first multi-dimensional image information and in combination with a control instruction, a preset distance along a telescopic direction with the handling apparatus, so as to form the second multi-dimensional image information.

In some embodiments, when the transport robot is performing a task of picking, the determining a second photographing strategy of the photographing module according to a determining result includes: in response to determining that there is the second item in the target position, performing an operation of picking, in response to determining that there is no second item in the target position, continuing photographing for a plurality of times; determining, for a plurality of times, whether there is the second item in the target position according to image information obtained by the plurality times of photographing; in response to number of continuing photographing reaching a preset photographing threshold and results of the plurality times of determining are that there is no second item in the target position, performing the operation of starting the solution;

in response to determining that there is the second item in the target position, determining whether the second item is a target item according to the second multi-dimensional image information; in response to determining that the second item is the target item, performing the operation of picking; in response to determining that the second item is not the target item, continuing photographing for a plurality of times; determining, for a plurality of times, whether the second item is the target item according to image information obtained by the plurality times of photographing; in response to number of continuing photographing reaching the preset photographing threshold and results of the plurality times of determining are that the second item is not the target item, performing the operation of starting the solution; or in response to determining that there is the second item in the target position, determining whether the second item is a target item according to the second multi-dimensional image information; in response to determining that the second item is the target item, determining whether pose information of the target item satisfies preset requirements according to the second multi-dimensional image information; in response to determining that the pose information of the target item satisfies preset requirements, performing the operation of picking; in response to determining that the pose information of the target item does not satisfy the preset requirements, continuing photographing for a plurality of times; determining, for a plurality of times, whether the pose information of the target item satisfies the preset requirements according to image information obtained by the plurality times of photographing; in response to number of continuing photographing reaching the preset photographing threshold and results of the plurality times of determining are that the pose information of the target item does not satisfy the preset requirements, performing the operation of starting the solution.

In some embodiments, when the transport robot is performing a task of picking, the determining a second photographing strategy of the photographing module according to a determining result includes: in response to determining, according to the second multi-dimensional image information, that there is no second item in the target position, the photographing module moving, according to the depth information of the target position in the second multi-dimensional image information and in combination with the control instruction, the preset distance along the telescopic direction with the handling apparatus.

In some embodiments, when the transport robot is performing a task of placing, the determining a second photographing strategy of the photographing module according to a determining result includes: in response to determining, that there is the second item in the target position, continuing photographing for a plurality of times; determining, for a plurality of times, whether there is the second item in the target position according to image information obtained by the plurality times of photographing; in response to number of continuing photographing reaching a preset photographing threshold and results of the plurality times of determining are that there is the second item in the target position, performing the operation of starting the solution.

The present disclosure provides a photographing system for picking or placing, including: a memory, a processor, and a photographing module, wherein the memory stores instructions executable by the processor, and the processor is configured to execute the executable instructions and control the photographing module to perform the photographing method mentioned above.

The present disclosure provides a transport robot, including a movable chassis, a handling apparatus, a storage shelf, a lifting or lowering assembly, and the photographing system above mentioned. The storage shelf is mounted on the movable chassis, the storage shelf is provided with a plurality of storage pallets distributed along a vertical direction, and each storage pallet is configured to place items; the handling apparatus is configured to handle the items between a fixed shelf and any one of the storage pallets; the lifting or lowering assembly is configured to drive the handling apparatus to move in the vertical direction, so that the handling apparatus is lifted or lowered to a height corresponding to one of the plurality of storage pallets or the fixed shelf; in a case that the handling apparatus is lifted or lowered to the height corresponding to one of the plurality of storage pallets, the handling apparatus moves an item to the corresponding storage pallet in a carrying direction, or the handling apparatus removes an item located on the corresponding storage pallet in a carrying direction; in a case that the handling apparatus is lifted or lowered to the height corresponding to the fixed shelf, the handling apparatus moves an item to the corresponding fixed shelf in the carrying direction, or the handling apparatus removes an item located on the corresponding fixed shelf in the carrying direction; the photographing module is configured to obtain multi-dimensional image information to determine a position of the item; and the handling apparatus includes a fork, and the fork is configured to pick or place the item, the photographing module is mounted on at least one of the following parts of the handling apparatus: a front end of a fork finger, a bottom of a pallet, and a rear end of a fork.

In some embodiments, the photographing module includes at least one of a two-dimensional camera, a three-dimensional camera, a variable-focus camera, and a camera matrix; or the photographing module includes at least one of a camera with a telephoto lens, a camera with a short focus lens, or a variable-focus camera; or the photographing module includes: a camera with a telephoto lens and a camera with a short focus lens, or a variable-focus camera; and the photographing module is mounted at the bottom of the pallet or the rear end of the fork of the handling apparatus; or the photographing module is mounted at the front end of the fork finger of the handling apparatus, and the photographing module moves a preset distance along a telescopic direction with the fork finger of the handling apparatus.

The present disclosure provides a computer-readable storage medium, storing a computer-executable instruction, when the computer-executable instruction is executed by a processor, the computer-executable instruction is configured to implement the photographing method for picking or placing mentioned above.

The present disclosure provides computer program product, including a computer program, wherein when executed by a processor, the computer program is configured to implement the photographing method for picking or placing mentioned above.

The present disclosure provides a photographing method for picking or placing, a photographing module, and a transport robot, which are applied to the transport robot. The transport robot is provided with a handling apparatus for picking or placing, and the photographing module. The method includes: obtaining first multi-dimensional image information of a target shelf including a target position, where more than one storage positions are arranged in the target shelf along a depth direction of the shelf; determining, according to the first multi-dimensional image information, whether there is a first item in the target position; and determining a photographing strategy of the photographing module according to a determining result, where the photographing strategy is used for obtaining target multi-dimensional image information of the target position, and the target position is a storage position allowing picking or placing by the handling apparatus in the target shelf. The photographing in the depth direction of the shelf is implemented to obtain multi-dimensional image information, so that the safety of picking or placing of the transport robot, and the working efficiency are improved.

BRIEF DESCRIPTION OF THE DRAWINGS

To describe the technical solutions in embodiments of the present disclosure or the related art more clearly, the accompanying drawings required for describing the embodiments or the related art are briefly introduced below. Apparently, the accompanying drawings in the following description show some embodiments of the present disclosure, and a person skilled in the art can still derive other accompanying drawings from these accompanying drawings without involving an inventive effort.

FIG. 6 is a second flowchart of a photographing method for picking or placing provided according to some embodiments of the present disclosure.

DETAILED DESCRIPTION

To describe the objectives, the technical solutions and the advantages of embodiments of the present disclosure more clearly, the technical solutions in the embodiments of the present disclosure are described more clearly and integrally by combining the accompanying drawings in the embodiments of the present disclosure. Apparently, the foregoing embodiments are some of the embodiments of the present disclosure, but not all the embodiments. Based on the embodiments of the present disclosure, all other embodiments obtained by a person skilled in the art without involving an inventive effort shall fall within the scope of protection of the present disclosure.

The terms "first", "second", "third", fourth" and so on (if existent) in the description and claims of the present disclosure and the foregoing accompanying drawings are intended to distinguish between similar objects but do not necessarily indicate a specific order or sequence. It is to be understood that the data used in such a way is interchangeable in proper circumstances, so that the embodiments of the present disclosure described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The technical solutions of the present disclosure and how to solve the foregoing technical problem using the technical solutions of the present disclosure are described in detail below with specific embodiments. The following specific embodiments may be combined with each other, and the same or similar concepts or processes may not be described in detail in some embodiments. The embodiments of the present disclosure will be described below with reference to the accompanying drawings.

In the related art, a plurality of items are placed on a shelf, so that the difficulty of picking or placing items of transport robots is increased. In addition, shelf vibration or manual operation errors in a real scenario further increase the difficulty of picking or placing items of transport robots, so that the safety of picking or placing items is reduced.

Figure 1:
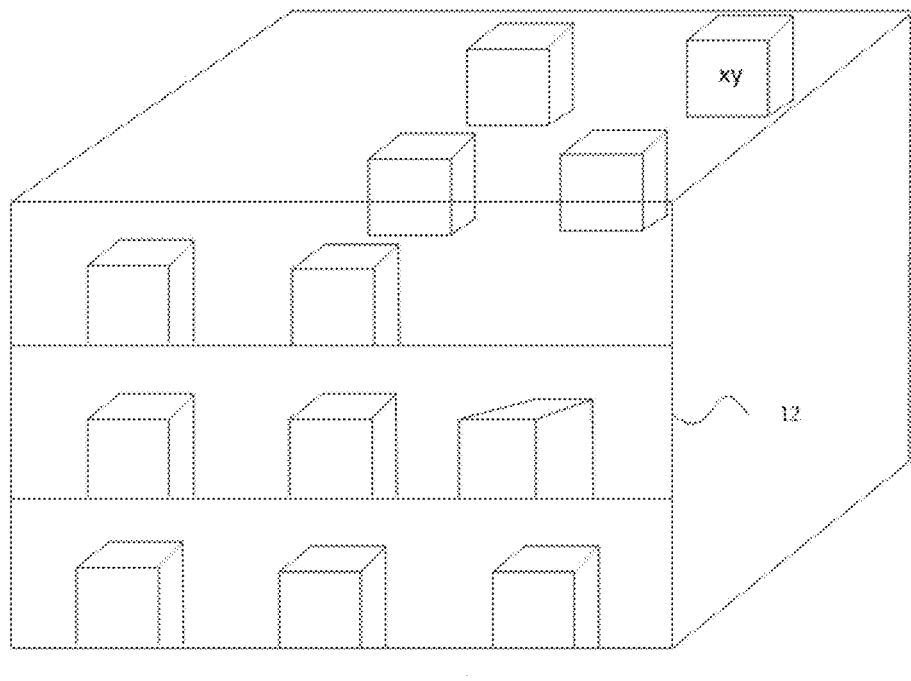
FIG. 1 is a diagram of a typical application scenario provided according to the present disclosure.

FIG. 1 is a diagram of a typical application scenario provided according to the present disclosure. As shown in FIG. 1, in this application scenario, a transport robot 11 may be used to pick or place a target item in a depth direction of a target shelf 12 (for example, an item behind a second item in the first row in FIG. 1). By applying a control method of the present disclosure, the safety of picking or placing items of the transport robot can be improved, so that the efficiency and accuracy of intelligent warehousing logistics is ensured.

Figure 2:
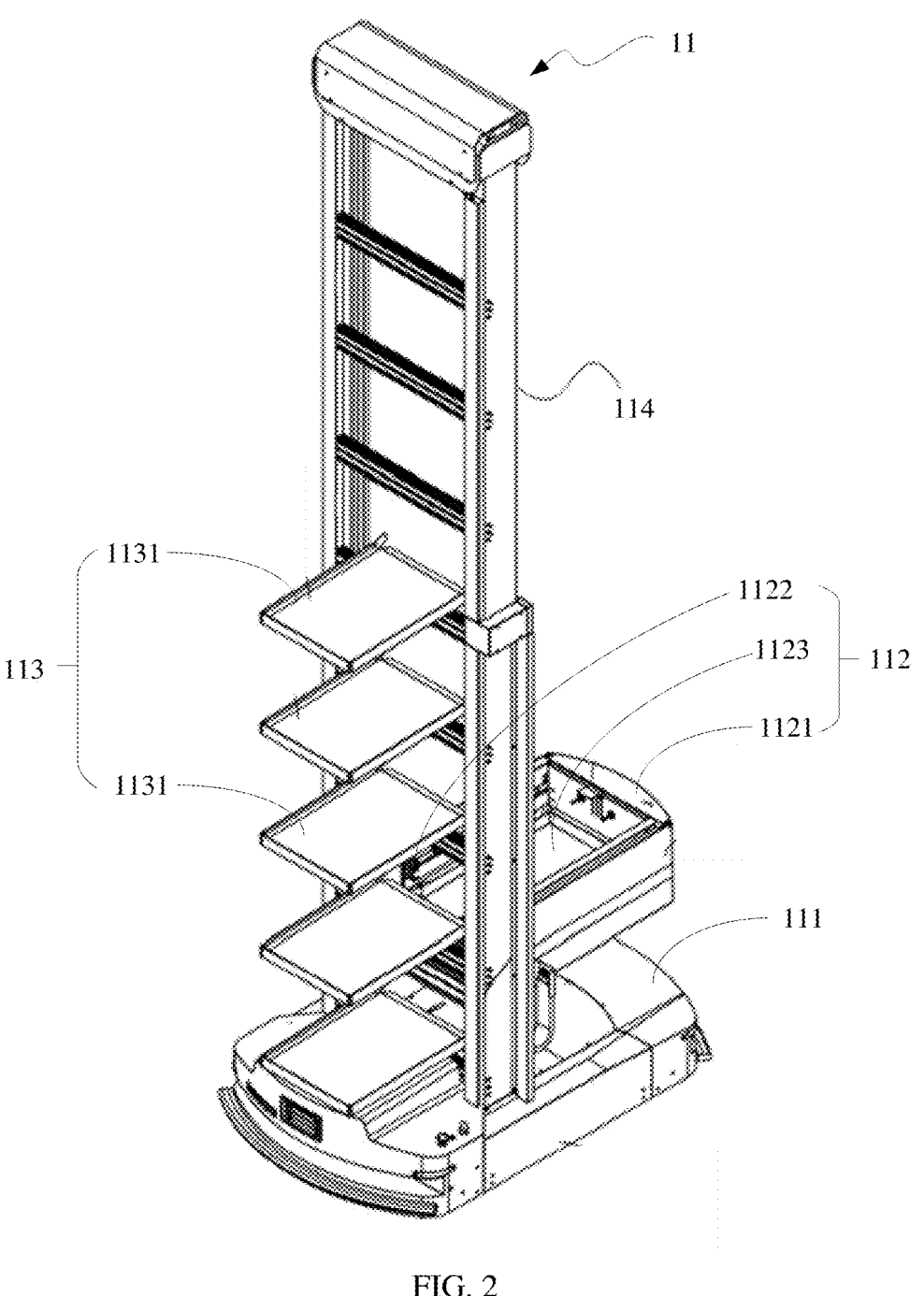
FIG. 2 is a schematic structural diagram of a transport robot according to some embodiments of the present disclosure.
Figures 2A, 3:
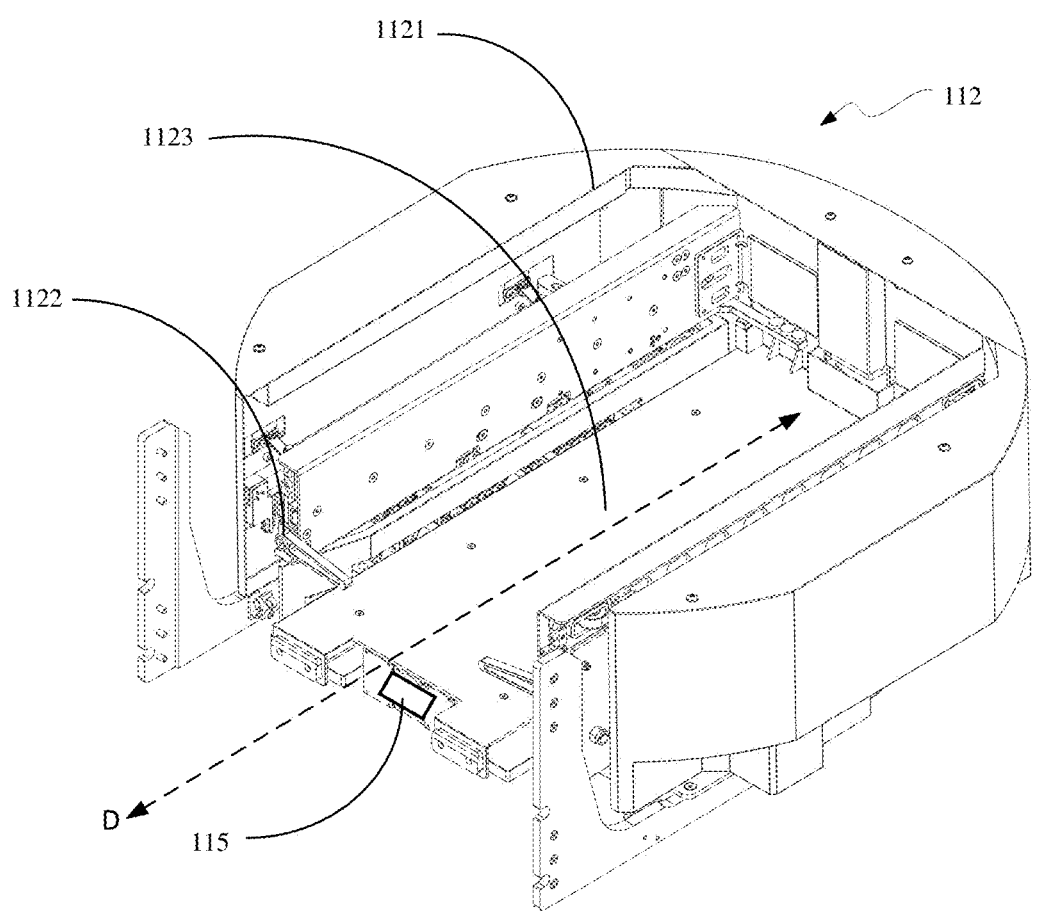
FIG. 2A is a schematic structural diagram of a handling apparatus according to some embodiments of the present disclosure.
FIG. 3 is a first flowchart of a photographing method for picking or placing provided according to some embodiments of the present disclosure.

FIG. 3 is a first flowchart of a photographing method for picking or placing provided according to some embodiments of the present disclosure. As shown in FIG. 3, the photographing method for picking or placing according to this embodiment may include the following operations.

In S201, first multi-dimensional image information of a target shelf including a target position is obtained, where more than one storage positions are arranged in the target shelf along a depth direction of the shelf. The target position is one of a shallow storage position at a first storage position in the target shelf along the depth direction of the shelf, a second storage position along the depth direction of the shelf and a deep storage position behind the second storage position.

In this embodiment, one or more storage positions may be arranged in the target shelf along the depth direction of the shelf. For example, referring to FIG. 1, a plurality of storage positions may be arranged on each layer of shelf. The target position may be a first storage position in the target shelf along the depth direction of the target shelf, or may be a second storage position along the depth direction of the target shelf, or a deep storage position behind the second storage position. Further, a photographing system obtains, by a photographing module, the first multi-dimensional image information of the target shelf including the target position, so as to determine, by detecting the first multi-dimensional image information, whether there is an item in the target position.

In S202, whether there is a first item in the target position is determined according to the first multi-dimensional image information.

In this embodiment, whether there is item point cloud information in the target position is detected according to the obtained first multi-dimensional image information, and in a case that there is the item point cloud information, it is determined that there is an item, for example, the first item.

In a case that no item point cloud information is detected in the target position, it is determined that there is no item.

In S203, a photographing strategy of the photographing module is determined according to a determining result, where the photographing strategy is configured to obtain target multi-dimensional image information of the target position. The target position is a storage position in the target shelf from which the handling apparatus is to pick an item up, or a storage position in the target shelf to which the handling apparatus is to place an item.

In this embodiment, the photographing strategy may include: the photographing module does not move with the handling apparatus in a telescopic direction for continued photographing, the photographing module moves a preset distance along the telescopic direction with the handling apparatus, or, an operation of starting a solution is performed. The solution may include at least one of stopping photographing, sending a warning signal, and reporting to a server to which the transport robot belongs.

For example, the photographing strategy of the photographing module is determined according to the determining result and in combination with a control instruction, so that target multi-dimensional image information of the target position is finally obtained. Subsequently, the handling apparatus may execute a corresponding action according to the target multi-dimensional image information, for example, picking or placing the target item.

Figure 4:
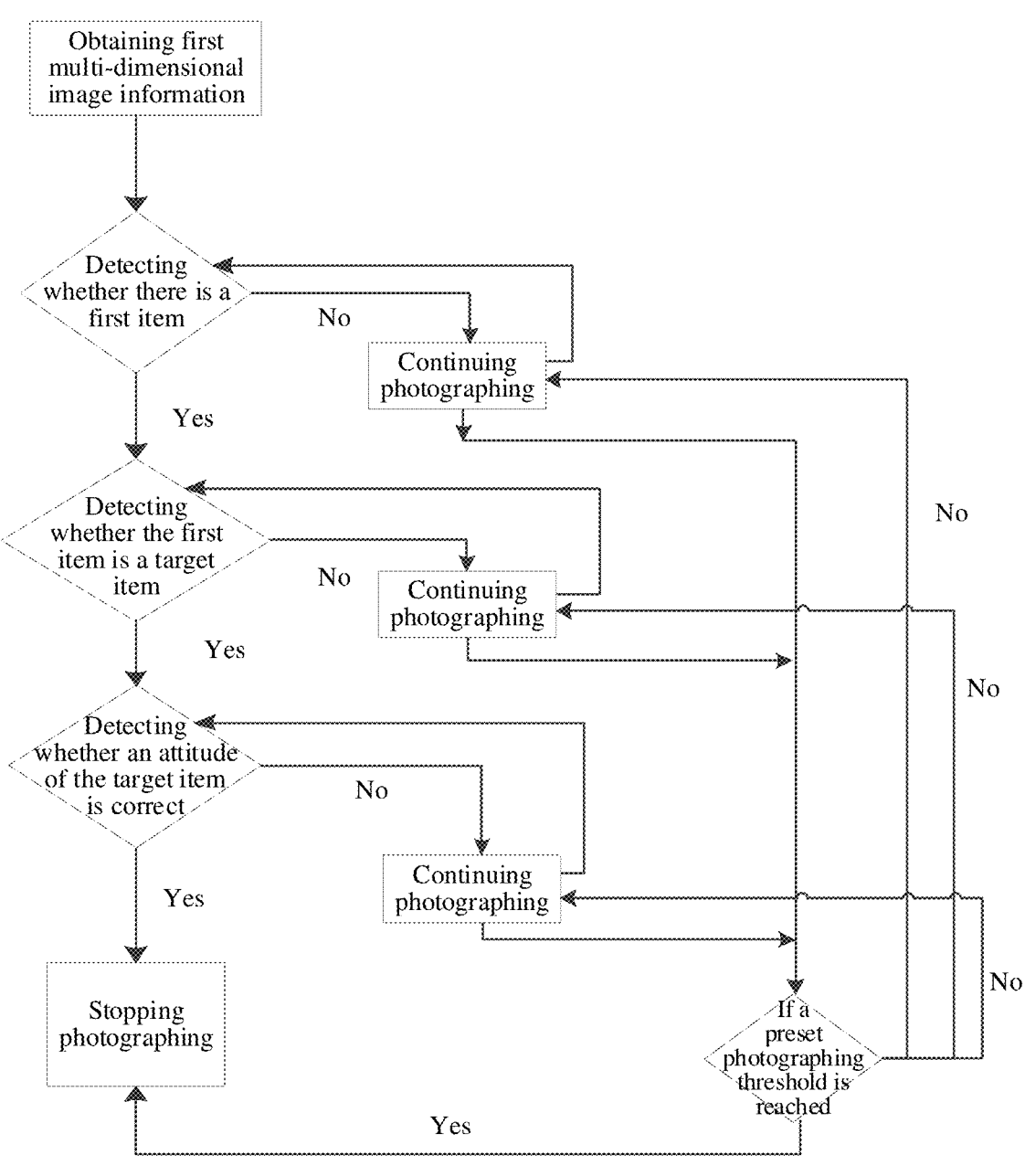
FIG. 4 is a first flowchart of determining a photographing module provided according to some embodiments of the present disclosure.

In an optional embodiment, in response to determining, according to the first multi-dimensional image information, that there is the first item in the target position, an operation of picking is performed. For example, in response to determining, by detecting the first multi-dimensional image information, that there is an item in the target position, for example, the first item, the operation of picking is performed. That is, it indicates that there is no shielding before the target position, and the transport robot could pick the item up. The target position may include the shallow storage position at a first storage position in the target shelf along the depth direction of the target shelf, may include the deep storage position of a second storage position along the depth direction of the target shelf, or the deep storage position behind the second storage position. For example, FIG. 4 is a first flowchart of determining a photographing module provided according to an embodiment of the present disclosure. In an optional embodiment, before the operation of determining whether there is the first item in the target position according to the first multi-dimensional image information, it is determined that there is no shielding before the target position (not shown).

In another optional embodiment, the operation of determining a photographing strategy of the photographing module according to a determining result, includes: in response to determining, according to the first multi-dimensional image information, that there is the first item in the target position, and that the first item is the target item, the operation of picking is performed. Example 1: Before the operation of determining whether there is the first item in the target position according to the first multi-dimensional image information, it is determined that there is no shielding before the target position. In response to determining, according to the first multi-dimensional image information, that there is an item in the target position, for example, the first item, and the first item is the target item to be picked up by the transport robot, the transport robot performs the operation of picking.

Furthermore, in another optional embodiment, the operation of determining a photographing strategy of the photographing module according to a determining result includes: in response to determining, according to the first multi-dimensional image information, that there is the first item in the target position, determining whether the first item is the target item. In response to determining that the first item is the target item, determining pose information of the target item according to the first multi-dimensional image information, and in a case that the pose information satisfies preset requirements, performing the operation of picking. Example 2: Before the operation of determining whether there is the first item in the target position according to the first multi-dimensional image information, it is determined that there is no shielding before the target position. In response to determining, according to the first multi-dimensional image information, that there is an item in the target position, for example, the first item, and the first item is the target item to be picked up by the transport robot, the pose information of the target item is detected according to the first multi-dimensional image information. In a case that the pose information satisfies the preset requirements, the transport robot performs operation of picking. The satisfying the preset requirements may include: in a case that it is predicted that the transport robot moves in the telescopic direction for picking, the pose information indicates safe picking that the handling apparatus may accommodate the target item, and the handling apparatus may not touch other objects, where the other objects may include at least one of other items or shelves.

In an optional embodiment, the implementation of example 1 and the implementation of example 2 may simultaneously occur, or may occur in sequence, for example, the implementation of example 1 may occur first, and then the implementation of example 2 occurs; or, the sequence of the implementation of example 1 and the sequence of the example 2 may be replaced, which is not limited in the present disclosure.

With reference to the embodiment shown in FIG. 3, the determining a photographing strategy of the photographing module according to a determining result may be further implemented in the following manner. Specifically, as shown in FIG. 4, after the robot obtains a picking instruction, different photographing strategies of the photographing module may be determined according to an actual determining result. The first position may include a target position or a storage position before the target position.

Furthermore, in an optional embodiment, in response to determining, according to the first multi-dimensional image information, that there is the first item in the first position, whether the first item is a target item is determined. In response to determining that the first item is the target item, the pose information of the target item is determined according to the first multi-dimensional image information. In a case that the pose information does not satisfy the preset requirements, an operation of starting a solution is performed. The solution includes at least one of stopping photographing, sending a warning signal, and reporting to a server to which the transport robot belongs. For example, in a case that it is determined, according to the first multi-dimensional image information, that there is the item point cloud information in the first position, then it is determined that there is an item, for example, the first item, and then whether the first item is the target item is determined. For example, in a case that the size of the first item is equal to the size of the target item (the size may include a width), then it is determined that the first item is the target item. Then, if it is determined that the pose information of the target item does not satisfy the preset requirements, for example, it is predicted, through the pose information of the target item, that the handling apparatus cannot safely picking the target item up, in a case that the number of consecutive photographing times reaches a preset threshold, the operation of starting the solution is performed. The pose information of the target item does not satisfy any one of the following preset requirements: being able to be accommodated in the handling apparatus, and not touching other items and shelves. In this embodiment, the preset threshold is not limited, for example, may be 5 times.

In an optional embodiment, in response to determining, according to the first multi-dimensional image information, that there is the first item in the first position, whether the first item is the target item is determined. In response to determining that the first item is the target item, the operation of starting the solution is performed. For example, in a case that it is determined, according to the first multi-dimensional image information, that there is the item point cloud information in the first position, then it is determined that there is an item, for example, the first item, and then whether the first item is the target item is determined. For example, in a case that the size of the first item is not equal to the size of the target item (the size may include a width) then it is determined that there is no target item, and the operation of starting the solution is performed. For example, the photographing is continued until the number of continuous photographing times reaches the preset threshold. The preset threshold is, for example, 5 times, which is not limited in this embodiment.

In an optional embodiment, in response to determining, according to the first multi-dimensional image information, that there is no first item in the first position, the operation of starting the solution is performed.

For example, in response to determining, according to the first multi-dimensional image information, that there is no item point cloud information in the first position, it is determined that there is no item; and the operation of starting the solution is performed. For example, in a case that the number of consecutive photographing times reaches the preset threshold, the photographing is stopped.

Figure 5:
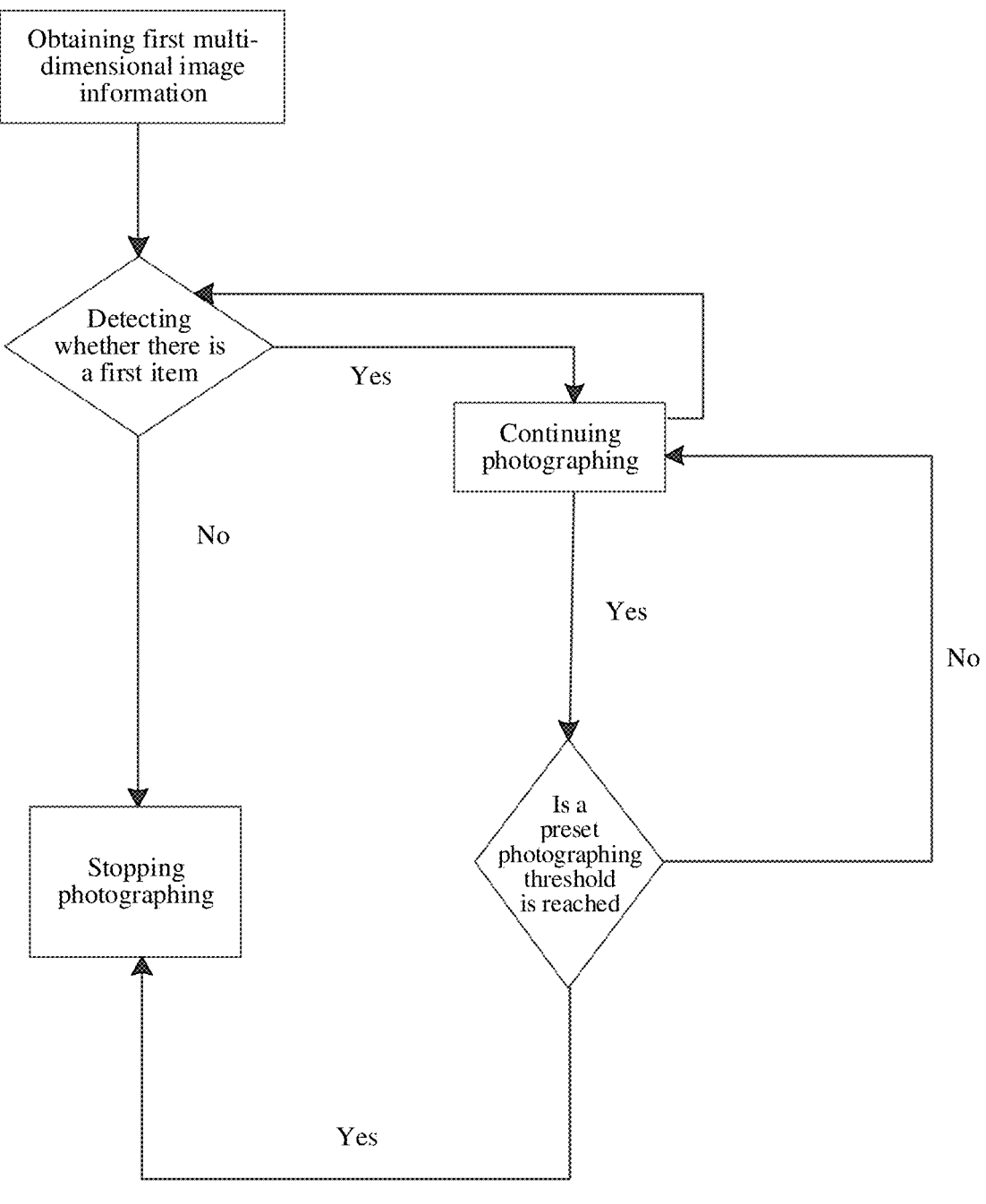
FIG. 5 is a second flowchart of determining a photographing strategy provided according to some embodiments of the present disclosure.

With reference to the embodiment shown in FIG. 3, the determining a photographing strategy of the photographing module according to a determining result may be further implemented in the following manner. Specifically, FIG. 5 is a second flowchart of determining a photographing strategy provided according to an embodiment of the present disclosure. As shown in FIG. 5, after the robot obtains a storage instruction, different photographing strategies of the photographing module may be determined according to an actual determining result.

In an optional embodiment, in response to determining, according to the first multi-dimensional image information, that there is no first item in the target position, an operation of placing is performed.

For example, in response to determining that there is no item point cloud information in the target position by detecting the first multi-dimensional image information, it is determined that there is no item in the target position. The handling apparatus may perform placing according to a placing instruction. Referring to FIG. 5, before the operation of determining whether there is the first item in the target position according to the first multi-dimensional image information, it is determined that there is no shielding before the target position (not shown). That is, it indicates that there is no shielding before the target position, and in response to determining, according to the first multi-dimensional image information, that there is no item in the target position, for example, the first item, the transport robot may perform the operation of placing. The target position may be a first storage position in the target shelf along the depth direction of the shelf, a second storage position along the depth direction of the shelf, or a deep storage position behind the second storage position.

In an optional embodiment, in response to determining, according to the first multi-dimensional image information, that there is the first item in the first position, the operation of starting the solution is performed. The first position may include a target position or a storage position before the target position.

For example, in a case that it is determined that there is the item point cloud information in the first position by detecting the first multi-dimensional image information, it indicates that there is an item, and the operation of starting the solution is performed, for example, a warning signal is sent.

In an optional embodiment, the first multi-dimensional image information may include first depth information, and whether there is the first item in the target position is determined through the first depth information.

For example, the first depth information is detected according to the first multi-dimensional image information, for example, 10 cm, and whether there is the item point cloud information in the target position is determined according to the first depth information. The first depth information may be less than, greater than or equal to depth information of the target position.

In an optional embodiment, the target position is a deep storage position. In response to determining that there is a second item in any storage position before the deep storage position, the operation of starting the solution is performed. For example, if the target position is a deep storage position, for example, a third storage position along the depth direction of the target shelf, in response to determining that there is the item point cloud information in a first storage position before the deep storage position, for example, there is a second item, the operation of starting the solution is performed.

In an optional embodiment, the first multi-dimensional image information includes the first depth information, and whether there is the second item is determined by detecting whether the first depth information corresponds to the depth information of the target position. The depth information of the target position may be obtained by a control instruction, for example, a picking control instruction or a placing control instruction.

For example, the first depth information of the first multi-dimensional image information, for example, 10 cm, is obtained. In response to determining, according to the depth information of the target position, for example, 10 cm, that the first depth information corresponds to the depth information of the target position (for example, the first depth information equals to the depth information of the target position), whether there is the second item in any storage position before the target position may be determined by detecting the first multi-dimensional image information. For example, in a case that there is the item point cloud information in any storage position before the target position, it is determined that there is an item, for example, the second item; or, in a case that there is no item point cloud information in any storage position before the target position, it is determined that there is no item. The target position may include a deep storage position.

With reference to the embodiment shown in FIG. 3, the obtaining first multi-dimensional image information of a target shelf including a target position may be implemented in the following manner. Specifically, the photographing module moves a preset distance along the telescopic direction with the handling apparatus. The photographing module may include one or two or a combination of more than two of a three-dimensional camera, a two-dimensional camera, a variable-focus camera, or a camera matrix.

For example, the target position may include a shallow storage position at a first storage position in the target shelf along the depth direction of the shelf, a deep storage position of a second storage position along the depth direction of the target shelf, or a deep storage position behind the second storage position. In an optional embodiment, the obtaining first multi-dimensional image information of a target shelf including a target position may be implemented in the following manner: the photographing module moves the preset distance along the telescopic direction with the handling apparatus. For example, in order to obtain a better target position image field of view, or in order to avoid interference of reflected light of a shelf plate, in a case that the first multi-dimensional image information is obtained, the photographing module may telescopically move the preset distance along the telescopic direction with the handling apparatus. The preset distance is not limited in this embodiment, and for example, may be 2 cm.

Furthermore, the handling apparatus may telescopically move outside the range of the target shelf, or may extend into the range of the target shelf to move.

For example, during the transport robot performs photographing, in order to obtain a better target position image field of view or to avoid interference of reflected light of the shelf plate, the handling apparatus may telescopically move outside the range of the target shelf in the photographing process, or may extend into the range of the target shelf to move, according to a detection result of the multi-dimensional image information, and in combination with the depth information of the target position in a real space, or the like. The detection result may include, for example, at least one of the first depth information, the pose information, the storage position, and the item point cloud information. The target shelf range may be a preset range of the target shelf in the real space, and a range other than the preset range in the real space may be represented as the outside of the target shelf range. In an optional embodiment, the solution may include at least one of stopping photographing, sending a warning signal, and reporting to a server to which the transport robot belongs. For example, the situation may include, stopping the photographing in a case that the number of consecutive photographing times is greater than the preset threshold, or stopping the photographing directly.

In another example, a warning signal may be sent. For example, a voice warning signal is sent or a color warning signal is sent through an indicator light or the like, which is not limited in this embodiment. For yet another example, it is required to be reported to the server to which the transport robot belongs.

FIG. 6 is a second flowchart of a photographing method for picking or placing provided according to some embodiments of the present disclosure. As shown in FIG. 6, the photographing method for picking or placing according to this embodiment may include the following operations.

In S301, first multi-dimensional image information of a target position on a target shelf is obtained, where a plurality of storage positions are arranged in the target shelf along a depth direction of the target shelf, and the plurality of storage positions include the target position and a first position before the target position.

In this embodiment, the plurality of storage positions are arranged in the target shelf along the depth direction of the target shelf, and include the target position and the first position before the target position. The target position may include a deep storage position behind a second storage position along the depth direction of the shelf. The first position may include any storage position before the target position. Referring to FIG. 1, the storage position where the item labeled as "xy" in the target shelf is located is the target position, and then the second storage position or the first storage position before the storage position may represent the first position.

In S302, it is determined, according to the first multi-dimensional image information, that there is no first item in the first position, and a first photographing strategy of the photographing module is determined to obtain second multi-dimensional image information.

With reference to the foregoing examples, it is determined that there is no item point cloud information in the first position by detecting the obtained first multi-dimensional image information, for example, there is no first item. That is, it indicates that the storage position before the target position does not shield the target position. Thus, the first photographing strategy of the photographing module is determined and the second multi-dimensional image information is obtained. The first photographing strategy may include: the photographing module does not move along the telescopic direction with the handling apparatus for continued photographing, and the photographing module moves the preset distance along the telescopic direction with the handling apparatus, or the solution is started.

In S303, whether there is a second item in the target position is determined according to the second multi-dimensional image information, and a second photographing strategy of the photographing module is determined according to a determining result. The photographing strategy is configured to obtain target image information of the target position, and the target position is a storage position in the target shelf from which the handling apparatus is to pick an item up, or a storage position in the target shelf to which the handling apparatus is to place an item.

In this embodiment, the second photographing strategy may include: the photographing module does not move along the telescopic direction with the handling apparatus for continued photographing, the photographing module moves the preset distance along the telescopic direction with the handling apparatus, or the solution is started.

For example, whether there is the second item in the target position is determined according to the obtained second multi-dimensional image information. The target position is different from the first position and is a deep storage position. In response to determining that there is item point cloud information in the target position by detecting the second multi-dimensional image information, it is determined that there is an item, for example, the second item. In response to determining that there is no item point cloud information in the target position by detecting the second multi-dimensional image information, it is determined that there is no item. The second photographing strategy of the photographing module is determined according to the determining result and in combination with the control instruction, so that target multi-dimensional image information of the target position is finally obtained, and subsequently, the handling apparatus may execute a corresponding action according to the target multi-dimensional image information, for example, picking/placing the target item.

Furthermore, in response to determining that there is no first item in the first position by detecting the first multi-dimensional image information, the operation of starting the solution is performed; or, in a case that the number of consecutive photographing times reaches the preset threshold, the operation of starting the solution is performed.

For example, in response to determining that there is no first item in the first position by detecting the first multi-dimensional image information, it is determined that the first photographing strategy of the photographing module is performing the operation of starting the solution; or, in a case that the number of consecutive photographing times reaches the preset threshold, the operation of starting solution is performed.

Figure 7:
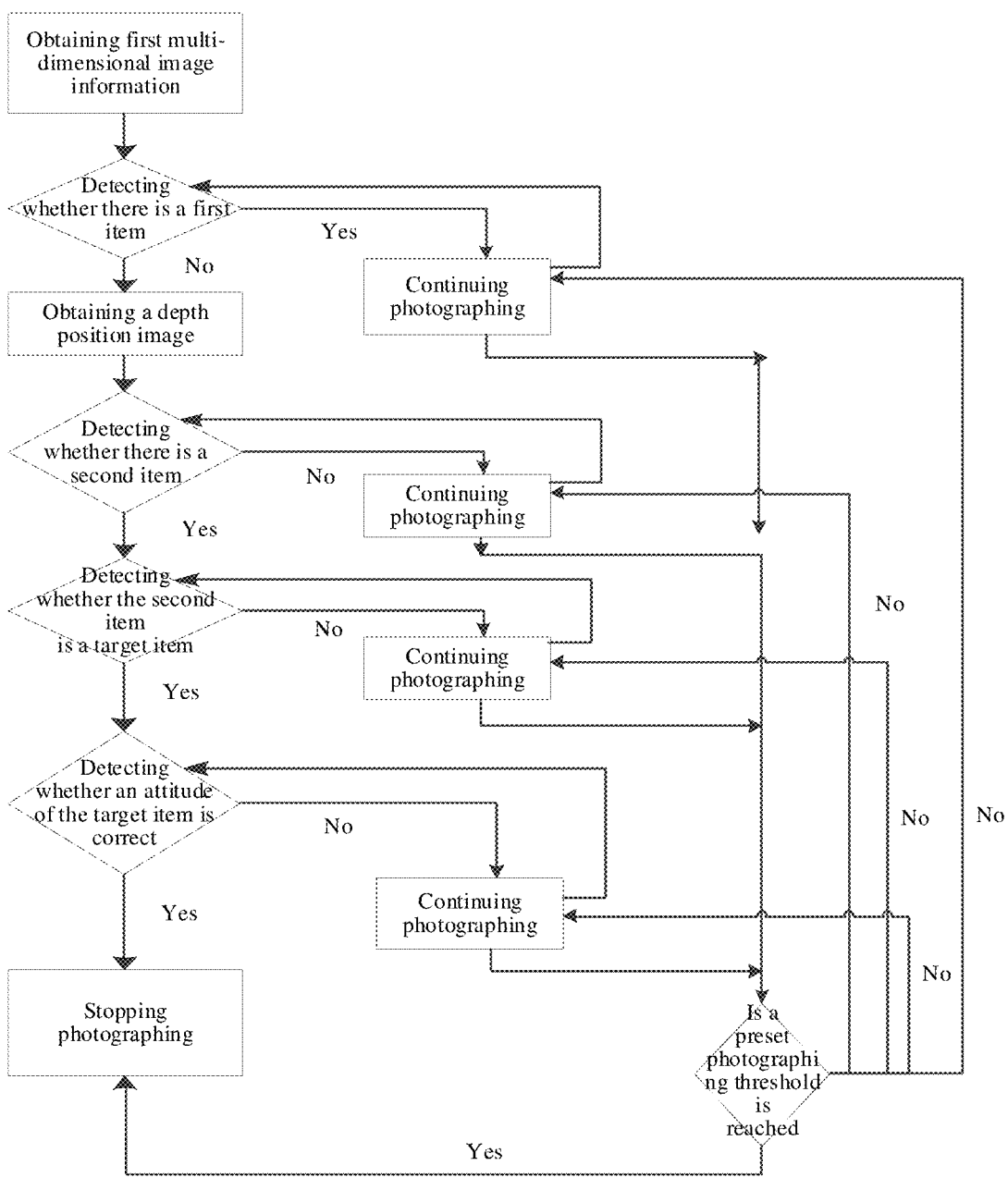
FIG. 7 is a third flowchart of determining a photographing module provided according to some embodiments of the present disclosure.
Figure 8:
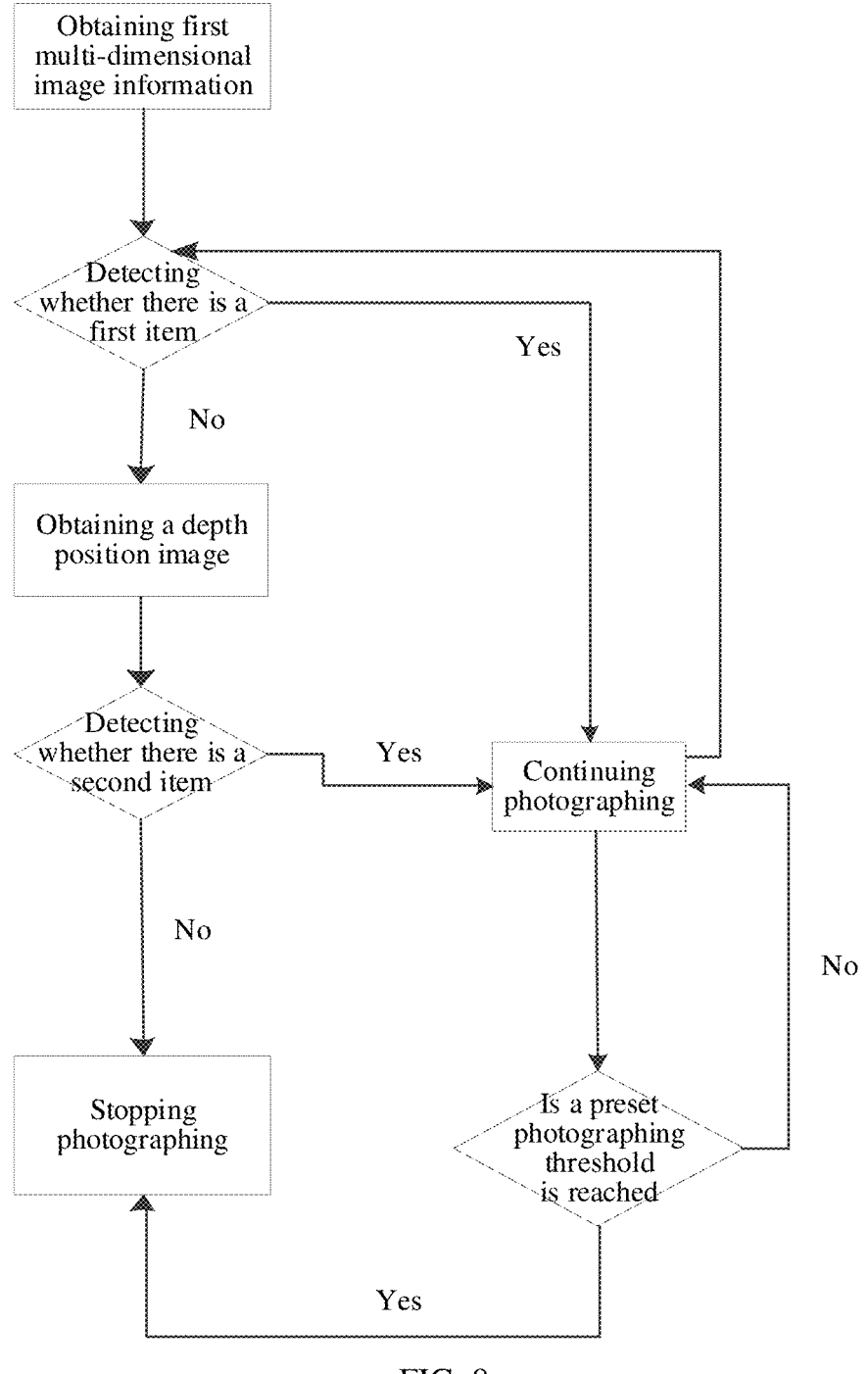
FIG. 8 is a fourth flowchart of determining a photographing module provided according to some embodiments of the present disclosure.

With reference to the embodiment shown in FIG. 6, the determining a first photographing strategy of the photographing module may be further implemented in the following manner. Specifically, referring to FIG. 7 and FIG. 8, FIG. 7 is a third flowchart of determining a photographing module provided according to some embodiments of the present disclosure, and FIG. 8 is a fourth flowchart of determining a photographing module provided according to some embodiments of the present disclosure. As shown in FIG. 7, the transport robot obtains a picking control instruction, or, as shown in FIG. 8, the robot obtains a placing control instruction. Different photographing strategies of the photographing module may be determined according to an actual determining result.

In response to determining, according to the first multi-dimensional image information, that there is no first item in the first position, the photographing module moves, according to the depth information of the target position in the first multi-dimensional image information, and in combination with a control instruction, the preset distance along the telescopic direction with the handling apparatus, so as to form the second multi-dimensional image information. The control instruction may include the depth information of the target position.

For example, in response to determining that there is no first item in the first position by detecting the first multi-dimensional image information, it is determined that the photographing module moves the preset distance along the telescopic direction with the handling apparatus according to the depth information of the target position in the first multi-dimensional image information, for example, 5 cm, and in combination with the depth information of the target position in the control instruction, for example, 10 cm, so as to form the second multi-dimensional image information. The preset distance may be equal to, greater than or less than 5 cm, which is not limited in this embodiment. The control instruction may include a picking instruction or a placing instruction.

In an optional embodiment, the determining a second photographing strategy of the photographing module according to a determining result includes: in response to determining, according to the second multi-dimensional image information, that there is the second item in the target position, performing an operation of picking.

For example, in a case that there is item point cloud information in the target position according to the second multi-dimensional image information, for example, the second item, and in an optional embodiment, the second item is an item to be picked up by the handling apparatus, then the operation of picking is performed.

In another optional embodiment, the determining a second photographing strategy of the photographing module according to a determining result includes: in response to determining, according to the second multi-dimensional image information, that there is the second item in the target position, and it is determined that the second item is a target item, the operation of picking is performed.

For example, in a case that there is the item point cloud information in the target position according to the second multi-dimensional image information, for example, the second item, and it is determined that the second item is the target item, then the operation of picking is performed. For example, in a case that the size of the second item is equal to the size of the target item (the size may include a width), then it is determined that the second item is the target item.

In an optional embodiment, in a case that it is determined that there is the second item in the target position according to the second multi-dimensional image information, the second item is determined as the target item, and pose information of the target item satisfies preset requirements, operation of picking is performed.

For example, it is determined that there is the second item in the target position according to the second multi-dimensional image information, and the second item is the target item to be picked up by the transport robot, then, the pose information of the target item is detected according to the second multi-dimensional image information. In a case that the pose information also satisfies the preset requirements, the transport robot performs the operation of picking. The satisfying the preset requirements may include it is predicted that the transport robot moves in the telescopic direction for picking, the pose information indicates safe picking that the handling apparatus may accommodate the target item, and the handling apparatus may not touch other objects. The other objects may include at least one of other items and shelves.

Furthermore, in an optional embodiment, in response to determining, according to the second multi-dimensional image information, that there is the second item in the target position, whether the second item is the target item is determined. In response to the second item is the target item, the pose information of the target item is determined according to the second multi-dimensional image information, and in a case that the pose information satisfies the preset requirements, the operation of picking is performed.

For example, in a case that it is determined, according to the second multi-dimensional image information, that there is the item point cloud information in the target position, then it is determined that there is an item, for example, the second item. Then, whether the second item is the target item is determined. For example, in a case that the size of the second item satisfies the size of the target item, that is, the size of the second item is equal to the size of the target item (the size may include a width), then it is determined that the second item is the target item. Then, the pose information of the target item is detected. In a case that the pose information of the target item indicates that the target item is able to be accommodated in the handling apparatus, without touching other items and shelves, the operation of picking is performed. The second multi-dimensional image information is determined as the target multi-dimensional image information. According to the target multi-dimensional image information, the transport robot executes a corresponding action, for example, picking the target item up.

In an optional embodiment, the determining a second photographing strategy of the photographing module according to a determining result includes: in response to determining, according to the second multi-dimensional image information, that there is the second item in the target position, determining whether the second item is the target item.

In response to determining that the second item is the target item, determining the pose information of the target item according to the second multi-dimensional image information, and if the pose information does not satisfy the preset requirements, in a case that the number of consecutive photographing times reaches the preset times threshold, the operation of starting the solution is performed.

For example, in a case that it is determined, according to the second multi-dimensional image information, that there is the item point cloud information in the target position, then it is determined that there is an item, for example, the second item. Whether the second item is the target item is determined. For example, in a case that the size of the second item satisfies the size of the target item, that is, the size of the second item is equal to the size of the target item (the size may include a width), then it is determined that the second item is the target item. Then, the pose information of the target item is detected. In response to detecting that the pose information of the target item does not satisfy any one of the following preset requirements: the target item being able to be accommodated in the handling apparatus, and without touching other items and shelves. In a case that the number of consecutive photographing times reaches the preset threshold, the operation of starting the solution is performed. In this embodiment, the preset threshold is not limited, for example, may be 5 times.

In an optional embodiment, in response to determining, according to the second multi-dimensional image information, that there is the second item in the target position, whether the second item is the target item is determined.

In response to determining that the second item is not the target item, in a case that the number of consecutive photographing times reaches the preset times threshold, the operation of starting the solution is performed.

For example, in response to determining, according to the second multi-dimensional image information, that there is the item point cloud information in the target position, then it is determined that there is an item, for example, the second item. Whether the second item is the target item is determined. For example, in a case that the size of the second item dose no satisfy the size of the target item, that is, the size of the second item is not equal to the size of the target item (the size may include a width), then the determining result is that the second item is not the target item. In a case that the number of consecutive photographing times reaches the preset threshold, the operation of starting the solution is performed. In this embodiment, the preset times threshold is not limited, for example, may be 5 times.

In an optional embodiment, if it is determined, according to the second multi-dimensional image information, that there is no second item in the target position, in a case that the number of consecutive photographing times reaches the preset times threshold, the operation of starting the solution is performed.

For example, in a case that it is determined, according to the second multi-dimensional image information, that there is item point cloud information in the target position, it is determined that there is no item. In a case that the number of consecutive photographing times reaches the preset times threshold, the operation of starting the solution is performed. In this embodiment, the preset times threshold is not limited, for example, may be 5 times.

With reference to the embodiment shown in FIG. 6, the determining a second photographing strategy of the photographing module according to a determining result may be further implemented in the following manner. Specifically, FIG. 8 is a fourth flowchart of determining a photographing module provided according to some embodiments of the present disclosure. As shown in FIG. 8, after the transport robot obtains a placing instruction, different photographing strategies of the photographing module may be determined according to an actual determining result. In an optional embodiment, in response to determining, according to the second multi-dimensional image information, that there is no second item in the target position, the photographing module moves the preset distance along the telescopic direction with the handling apparatus according to the depth information of the target position in the second multi-dimensional image information, and in combination with the control instruction.

For example, in response to determining that there is no item point cloud information in the target position by detecting the second multi-dimensional image information, the photographing module moves the preset distance along the telescopic direction with the handling apparatus according to the depth information of the target position in the second multi-dimensional image information, for example, 10 cm, and in combination with depth information of a real space included in the control instruction, for example, 15 cm, so as to further obtain the second multi-dimensional image information including the target position. In an optional embodiment, the handling apparatus may directly execute a placing action according to the second multi-dimensional image information.

In an optional embodiment, if it is determined, according to the second multi-dimensional image information, that there is the second item in the target position, and in a case that the number of consecutive photographing times reaches the preset times threshold, the operation of starting the solution is performed.

For example, if it is determined, according to the second multi-dimensional image information, that there is the item point cloud information in the target position, and in a case that the number of consecutive photographing times reaches the preset threshold, the operation of starting the solution is performed.

In an optional embodiment, the photographing module includes at least one of a two-dimensional camera, a three-dimensional camera, a variable-focus camera, and a camera matrix.

For example, the photographing module may include a two-dimensional camera (e.g., a monochrome camera and a color camera), a multi-dimensional camera (e.g., a three-dimensional camera, for example, a depth camera or a panoramic camera), a combination of a plurality of cameras, a different-angle multi-lens camera, or a multi-dimensional camera matrix composed of cameras of different dimensions. It is only required to obtain the multi-dimensional image information of the target item. The photographing module further includes a variable-focus camera.

In an optional embodiment, the photographing module is mounted on at least one of the following parts of the handling apparatus: a front end of a fork finger, a bottom of a pallet, and a rear end of the fork.

In an optional embodiment, the photographing module includes: a camera with a telephoto lens and a camera with a short focus lens, and the photographing module is mounted at the bottom of the pallet or the rear end of the fork of the handling apparatus.

In an optional embodiment, the photographing module is mounted at the front end of the fork finger of the handling apparatus, and the photographing module moves a preset distance along the telescopic direction with the fork finger of the handling apparatus.

In an optional embodiment, the photographing module includes: the variable-focus camera, and the photographing module is mounted at the bottom of the pallet or the rear end of the fork of the handling apparatus.

In an optional embodiment, in a case that the photographing module includes a plurality of cameras, the photographing module includes at least one of the camera with the telephoto lens, the camera with the short focus lens, and the variable-focus camera. The plurality of cameras of the photographing module may be configured separately or in an integrated manner.

For example, the photographing module is the three-dimensional camera and may be mounted at the front end of the fork finger of the handling apparatus. In an optional embodiment, in order to avoid interference of reflected light of a shelf plate, in a case that the multi-dimensional image information is obtained, the photographing module moves a preset distance along the telescopic direction with the fork finger of the handling apparatus. In another example, the photographing module includes the camera with the short-focus lens and the camera with the telephoto lens, and the two cameras are mounted on the bottom of the fork pallet of the transport robot in parallel. In an optional embodiment, in a case that the shallow storage position is photographed, the camera with the short-focus lens may be used, and in a case that the deep storage position is photographed, the camera with the telephoto lens may be used. For yet another example, the photographing module includes the camera with the short-focus lens, and the camera with the short-focus lens is mounted at the front end of the fork finger of the handling apparatus. In an optional embodiment, in a case that the deep storage position is photographed, the camera with the short-focus lens moves along the telescopic direction with the handling apparatus for the preset distance. For yet another example, the photographing module includes the variable-focus camera, and the variable-focus camera may be mounted at the rear end of the fork. In an optional embodiment, the variable-focus camera may be used regardless of whether the shallow storage position or the deep storage position is photographed.

Figure 9:
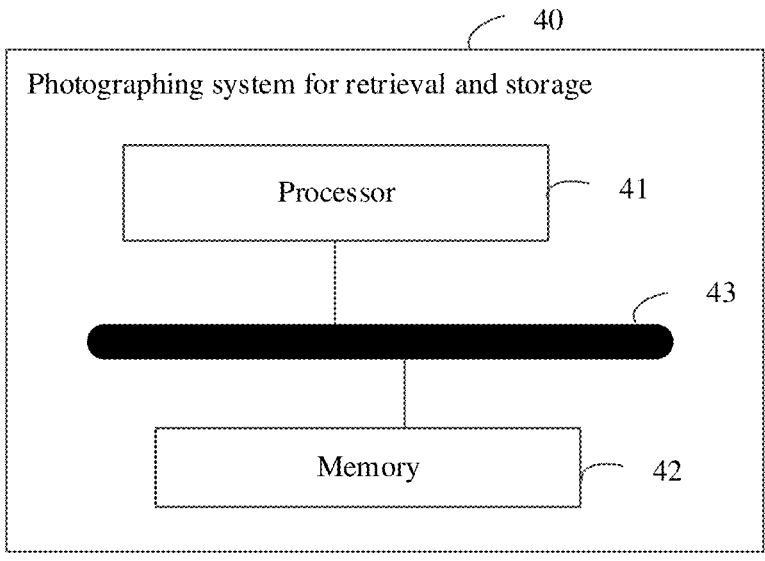
FIG. 9 is a schematic structural diagram of a photographing system for picking or placing provided according to some embodiments of the present disclosure.

FIG. 9 is a schematic structural diagram of a photographing system for picking or placing provided according to an embodiment of the present disclosure. As shown in FIG. 9, the photographing system for picking or placing 40 according to this embodiment may include: a processor 41 and a memory 42.

The memory 42 is configured to store computer programs (for example, an application program, functional modules, and the like for implementing the photographing method for picking or placing), computer instructions, and the like.

The computer programs, the computer instructions, and the like described above may be stored respectively in one or more memories 42. Moreover, the computer programs, the computer instructions, data, and the like may be invoked by the processor 41.

The processor 41 is configured to execute the computer programs stored in the memory 42, to implement steps in the method in the foregoing embodiments.

For details, reference may be made to related descriptions in the foregoing method embodiments.

The processor 41 and the memory 42 may be separate structures, or may be an integrated structure. When the processor 41 and the memory 42 are separate structures, the memory 42 and the processor 41 may be coupled to each other through a bus 43.

The server in this embodiment may execute the technical solutions in the method shown in FIG. 3 and FIG. 6, and for specific implementation processes and technical principles thereof, reference may be made to related descriptions in the method shown in FIG. 3 and FIG. 6, which are not described herein again.

In addition, the embodiments of the present disclosure further provide a computer-readable storage medium. The computer-readable storage medium stores a computer-executable instruction. When at least one processor of a user equipment executes the computer-executable instruction, the user equipment performs the foregoing various possible methods.

The computer-readable medium includes a computer storage medium and a communication medium, where the communication medium includes any medium that facilitates transmission of a computer program from one place to another place. The storage medium may be any available medium that can be accessed by a general purpose or special purpose computer. An exemplary storage medium is coupled to the processor such that the processor can read information from, and write information to, the storage medium. Of course, the storage medium may also be a constituent part of the processor. The processor and the storage medium may be located in an ASIC. In addition, the ASIC may be located in the user equipment. Of course, the processor and the storage medium may be stored in a communication device as discrete components.

A person skilled in the art may understand that: all or some of the steps of the foregoing embodiments may be implemented by a program instructing relevant hardware. The program may be stored in a computer-readable storage medium. When the program is executed, the steps of the embodiments are performed. The foregoing storage medium includes: any medium such as a ROM, an RAM, a magnetic disk, or an optical disc that can store program codes.

Finally, it is to be noted that the foregoing embodiments are merely intended to illustrate the technical solutions of the present disclosure, but not to limit the present disclosure. Although the present disclosure is described in detail with reference to the foregoing embodiments, a person skilled in the art shall understand that the technical solutions described in the foregoing embodiments may still be modified, or some or all of the technical features may be equivalently replaced. Moreover, these modifications or replacements do not make the essence of the corresponding technical solutions depart from the scope of the technical solutions of the embodiments of the present disclosure.

What is claimed is:

1. A photographing method for picking or placing a target item, applied to a transport robot, comprising:

obtaining first multi-dimensional image information of a target position in a target shelf, wherein more than one storage positions are arranged in the target shelf along a depth direction of the target shelf, and the target position is a storage position in the target shelf from which the transport robot is to pick the target item up, or a storage position in the target shelf to which the transport robot is to place the target item;

determining, according to the first multi-dimensional image information, whether there is a first item in the target position; and performing an operation of starting a solution, wherein the solution comprises at least one of stopping photographing, sending a warning signal, and reporting to a server to which the transport robot belongs;

wherein the target position is a shallow storage position at a first storage position in the target shelf along the depth direction of the shelf, a second storage position along the depth direction of the shelf, or a deep storage position behind the second storage position;

wherein the target position is the deep storage position, before the determining, according to the first multi-dimensional image information, whether there is a first item in the target position, the method further comprises:

determining, according to the first multi-dimensional image information, whether there is a second item in any storage position in front of the deep storage position; and in response to determining that there is a second item in any storage position in front of the deep storage position, performing the operation of starting the solution.

2. The photographing method according to claim 1, wherein when the transport robot is performing a task of picking, the performing an operation of starting a solution further comprises:

in response to determining that there is the first item in the target position, performing an operation of picking; in response to determining that there is no first item in the target position, continuing photographing for a plurality of times; determining, for a plurality of times, whether there is the first item in the target position according to image information obtained by the plurality times of photographing; in response to number of continuing photographing reaching a preset photographing threshold and results of the plurality times of determining are that there is no first item in the target position, performing the operation of starting the solution; or in response to determining that there is the first item in the target position, determining whether the first item is the target item according to the first multi-dimensional image information; in response to determining that the first item is the target item, performing the operation of picking; in response to determining that the first item is not the target item, continuing photographing for a plurality of times; determining, for a plurality of times, whether the first item is the target item according to image information obtained by the plurality times of photographing; in response to number of continuing photographing reaching the preset photographing threshold and results of the plurality times of determining are that the first item is not the target item, performing the operation of starting the solution; or in response to determining that there is the first item in the target position, determining whether the first item is a target item according to the first multi-dimensional image information; in response to determining that the first item is the target item, determining whether pose information of the target item satisfies preset requirements according to the first multi-dimensional image information; in response to determining that the pose information of the target item satisfies the preset requirements, performing the operation of picking; in response to determining that the pose information of the target item does not satisfy the preset requirements, continuing photographing for a plurality of times; determining, for a plurality of times, whether the pose information of the target item satisfies the preset requirements according to image information obtained by the plurality times of photographing; in response to number of continuing photographing reaching the preset photographing threshold and results of the plurality times of determining are that the pose information of the target item does not satisfy the preset requirements, performing the operation of starting the solution.

3. The photographing method according to claim 1, wherein when the transport robot is performing a task of placing, the performing an operation of starting a solution further comprises:

in response to determining that there is no first item in the target position, performing the operation of placing; and in response to determining that there is the first item in the target position, performing the operation of starting the solution.

4. The photographing method according to claim 1, wherein the first multi-dimensional image information comprises first depth information, and the determining, according to the first multi-dimensional image information, whether there is a first item in the target position, comprises: determining, according to the first depth information, whether there is the first item in the target position.

5. The photographing method according to claim 1, wherein the first multi-dimensional image information comprises first depth information, and whether there is the second item is determined by detecting whether the first depth information corresponds to depth information of the target position.

6. A photographing system for picking or placing a target item, applied to a transport robot, comprising:

a memory, and a processor, wherein the memory stores instructions executable by the processor, and the processor is configured to execute the executable instructions and control the transport robot to perform operations of:

obtaining first multi-dimensional image information of a target position in a target shelf, wherein more than one storage positions are arranged in the target shelf along a depth direction of the target shelf, and the target position is a storage position in the target shelf from which the transport robot is to pick the target item up, or a storage position in the target shelf to which the transport robot is to place the target item;

determining, according to the first multi-dimensional image information, whether there is a first item in the target position; and performing an operation of starting a solution, wherein the solution comprises at least one of stopping photographing, sending a warning signal, and reporting to a server to which the transport robot belongs;

wherein the target position is a shallow storage position at a first storage position in the target shelf along the depth direction of the shelf, a second storage position along the depth direction of the shelf, or a deep storage position behind the second storage position;

wherein the target position is the deep storage position, before the determining, according to the first multi-dimensional image information, whether there is a first item in the target position, the processor is further configured to control the transport robot to perform;

determining, according to the first multi-dimensional image information, whether there is a second item in any storage position in front of the deep storage position; and in response to determining that there is a second item in any storage position in front of the deep storage position, performing the operation of starting the solution.

7. A non-transitory computer-readable storage medium, storing a computer-executable instruction, wherein when the computer-executable instruction is executed by a processor, the computer-executable instruction is configured to control a transport robot to perform:

obtaining first multi-dimensional image information of a target position in a target shelf, wherein more than one storage positions are arranged in the target shelf along a depth direction of the target shelf, and the target position is a storage position in the target shelf from which the transport robot is to pick an item up, or a storage position in the target shelf to which the transport robot is to place an item;

determining, according to the first multi-dimensional image information, whether there is a first item in the target position; and performing an operation of starting a solution, wherein the solution comprises at least one of stopping photographing, sending a warning signal, and reporting to a server to which the transport robot belongs;

wherein the target position is a shallow storage position at a first storage position in the target shelf along the depth direction of the shelf, a second storage position along the depth direction of the shelf, or a deep storage position behind the second storage position;

wherein the target position is the deep storage position, before the determining, according to the first multi-dimensional image information, whether there is a first item in the target position, the computer-executable instruction is further configured to control a transport robot to perform:

determining, according to the first multi-dimensional image information, whether there is a second item in any storage position in front of the deep storage position; and in response to determining that there is a second item in any storage position in front of the deep storage position, performing the operation of starting the solution.

8. A photographing method for picking or placing a target item, applied to a transport robot, comprising:

obtaining first multi-dimensional image information of a target position in a target shelf, wherein more than one storage positions are arranged in the target shelf along a depth direction of the target shelf, and the target position is a storage position in the target shelf from which the transport robot is to pick the target item up, or a storage position in the target shelf to which the transport robot is to place the target item;

determining, according to the first multi-dimensional image information, whether there is a first item in the target position; and performing an operation of starting a solution, wherein the solution comprises at least one of stopping photographing, sending a warning signal, and reporting to a server to which the transport robot belongs;

wherein when the transport robot is performing a task of picking, the performing an operation of starting a solution further comprises:

in response to determining that there is the first item in the target position, performing an operation of picking; in response to determining that there is no first item in the target position, continuing photographing for a plurality of times; determining, for a plurality of times, whether there is the first item in the target position according to image information obtained by the plurality times of photographing; in response to number of continuing photographing reaching a preset photographing threshold and results of the plurality times of determining are that there is no first item in the target position, performing the operation of starting the solution; or in response to determining that there is the first item in the target position, determining whether the first item is the target item according to the first multi-dimensional image information; in response to determining that the first item is the target item, performing the operation of picking; in response to determining that the first item is not the target item, continuing photographing for a plurality of times; determining, for a plurality of times, whether the first item is the target item according to image information obtained by the plurality times of photographing; in response to number of continuing photographing reaching the preset photographing threshold and results of the plurality times of determining are that the first item is not the target item, performing the operation of starting the solution; or in response to determining that there is the first item in the target position, determining whether the first item is a target item according to the first multi-dimensional image information; in response to determining that the first item is the target item, determining whether pose information of the target item satisfies preset requirements according to the first multi-dimensional image information; in response to determining that the pose information of the target item satisfies the preset requirements, performing the operation of picking; in response to determining that the pose information of the target item does not satisfy the preset requirements, continuing photographing for a plurality of times; determining, for a plurality of times, whether the pose information of the target item satisfies the preset requirements according to image information obtained by the plurality times of photographing; in response to number of continuing photographing reaching the preset photographing threshold and results of the plurality times of determining are that the pose information of the target item does not satisfy the preset requirements, performing the operation of starting the solution.

* * * * *